2,813,844

AMINE-FORMALDEHYDE RESIN COMPOSITIONS MODIFIED WITH VINYL PYRROLIDONE POLYMERS AND PROCESS OF SIZING GLASS SURFACE THEREWITH

Jesse Werner, Holliswood, N. Y., Robert Steckler, Chagrin Falls, Ohio, and Frederick A. Hessel, Upper Montclair, N. J., assignors to General Aniline & Film Corporation, New York, N. Y., a corporation of Delaware No Drawing. Application November 18, 1955, Serial No. 547,826

12 Claims. (Cl. 260—45.2)

The present invention relates to thermosetting compositions comprising a mixture of an amine-formaldehyde resin and a N-vinyl pyrrolidone polymer having improved adhesion to glass and fibrous glass material.

Various polymers and copolymers have been suggested as bonding agents for glass cloth, glass fibers, glass mats, roving, and the like. Polymers of allyl esters of saturated and unsaturated dibasic acids have been employed in the preparation of Fiberglas laminates and glass reinforced plastic objects. Blends of diallyl esters copolymerized with another mono-functional or poly-functional vinyl monomer have yielded a wide variety of cross-linked copolymers which have been suggested as reinforcing or bonding agents for glass laminates. The principal disadvantage of such polymers and copolymers, when employed as a laminating agent, is that the resulting cured polymer or copolymer has poor adhesion to glass cloth, glass fibers, glass mats, and the like. If glass cloth, mats or glass fibers are impregnated with such polymers and copolymers and built into laminates followed by final curing, the laminates do not exhibit their optimum properties such as flexural strength and modulus of elasticity.

Amine-formaldehyde resins such as melamine-formaldehyde resins and urea-formaldehyde resins, although having many desirable properties, have certain inherent drawbacks which prevent their full commercial use as reinforcing resins for laminating purposes. Processing conditions for melamine-formaldehyde resins are critical and minor variations from the optimum conditions result in inferior and unusable laminates. However, even under the most carefully controlled conditions, the resulting laminates have low flexural strengths and a low modulus, both wet and dry. Urea-formaldehyde resins are so brittle, in fact, and are so lacking in adhesion, that up to the present time, they have been rarely used in commercial laminating applications.

It is an object of this invention to overcome the foregoing difficulties and to provide new modified amine-formaldehyde resin compositions having excellent adhesion to various types of glass materials, while still maintaining excellent water insensitivity.

Another object is to provide processes for preparing compositions of amine-formaldehyde resins modified with a polymer or copolymer of N-vinyl pyrrolidone and glass material, such as fibers, strands, mats, cloth, flakes, and other glass materials.

Other objects and advantages will become more clearly apparent from the following specification.

We have found that amine-formaldehyde resins such as melamine-formaldehyde and urea-formaldehyde are successfully modified to yield excellent adhesion to glass, glass fibers, strands, mats, cloth, and other glass materials by employing a mixture containing from 80 to 97% by weight of an amine-formaldehyde resin and from 20 to 3% by weight of a polymer of N-vinyl pyrrolidone. By the latter term we include homopolymers of vinyl pyrrolidone and copolymers with other polymerizable vinyl monomers. Such a resin mixture may be used not only as a laminating agent between two sheets or mats of glass, but may be used by itself as an unsupported film with glass included in its composition as a reinforcing agent. Its use as a laminating agent yields excellent structural compositions, which also have the advantage of an inexpensive amine-formaldehyde resin. Despite the fact that the modified amine-formaldehyde composition may contain as much as 20% of a N-vinyl pyrrolidone either in the form of a polymer or copolymer, the resulting laminates and films, even after prolonged water immersion, display tenacious adhesion to glass, and with no apparent leaching.

The mixture of an amine-formaldehyde resin and polymer or copolymer of N-vinyl pyrrolidone may be prepared in several ways. For example, if a melamine-formaldehyde solid molding powder is used, part of the powder may be replaced by solid polymer or copolymer of N-vinyl pyrrolidone in the aforestated percent weight ratios. If an aqueous urea-formaldehyde resin is used aqueous solutions of a polymer or copolymer of N-vinyl pyrrolidone may be added to form the mixture. The solutions are so adjusted that they contain a solid or resin content in the aforestated percent weight ratios. The melamine-formaldehyde and urea-formaldehyde resins may be used in aqueous solution to which an aqueous solution of the polymer or copolymer of N-vinyl pyrrolidone may be added to form the mixture. Powdered melamine-formaldehyde and urea-formaldehyde resins may be mixed with powdered polymer or copolymer of N-vinyl pyrrolidone.

A mixture of the reaction product of N-vinyl pyrrolidone and formaldehyde, in solid or solution form, may be blended with the solid or solution of the amine-formaldehyde resin to yield thermosetting compositions having improved adhesion to glass and fibrous glass materials. Compositions obtained by co-reacting N-vinyl pyrrolidone with phenol-formaldehyde, melamine-formaldehyde or urea-formaldehyde resins in solution can also be employed to yield excellent adhesion to glass and glass fibers. It is also possible to employ compositions obtained by the addition of N-vinyl pyrrolidone during the initial condensation of phenol, melamine, or urea, with formaldehyde.

The polymers of N-vinyl pyrrolidone which may be employed in admixture with the amine-formaldehyde resin are characterized by the following general formula:

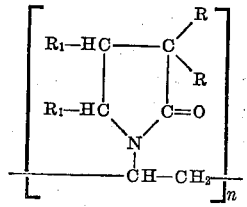

wherein R and $R_1$ represent either hydrogen, methyl or ethyl groups, and $n$ represents a number indicative of the extent of polymerization. The number of recurring polymer units indicated by "$n$" usually corresponds to a chain of 192 to 980 monomer units.

As illustrations of the monomers which are employed in preparing the polymers and copolymers, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
4-methyl-N-vinyl-2-pyrrolidone
4-ethyl-N-vinyl-2-pyrrolidone All of the copolymers of N-vinyl pyrrolidone characterized by the foregoing general formula are commercially available, and are readily prepared by the procedural steps given in U. S. P. 2,265,450; 2,317,804 and 2,335,454, in which working examples of all the species characterized by the above formula are given.

The copolymers of N-vinyl pyrrolidone with other polymerizable monomers include:

N-vinyl pyrrolidone—vinyl acetate
N-vinyl pyrrolidone—maleic anhydride
N-vinyl pyrrolidone—diallyl phthalate
N-vinyl pyrrolidone—acrylonitrile All of the aforementioned copolymers are readily prepared by following the methods given in the literature. The only restriction imposed upon such copolymers is that the vinyl pyrrolidone content be at least 40%.

The amine-formaldehyde resins, e. g. melamine-formaldehyde and urea-formaldehyde, are readily available on the open market in various grades all of which are available for the purpose of the present invention.

The amine-formaldehyde resins may contain from two to six moles of formaldehyde per mole of melamine or urea. The process of preparing such resins is fully described in U. S. P. 2,302,765, the disclosure of which is incorporated herein by reference. Typical properties of cured, commercially available, melamine resins are as follows:

Specific gravity _____ 1.76–1.98
Tensile (p. s. i.) _____ 5,500–10,000
Compressive (p. s. i.) _____ 30,000
Flexural (p. s. i.) _____ 7,500–16,500
Impact Izod (ft. lb.) _____ 0.28–0.40

A procedure which yields a melamine-formaldehyde resin suitable for preparing Fiberglas melamines consists of mixing 93 parts by weight (3 moles) of melamine, 246 parts by weight (10 moles) of 30% aqueous formaldehyde and 6 parts by weight 10% aqueous sodium hydroxide and then heating the mixture with agitation to 70° C. for 10 minutes. During this time the suspension begins to clear and within the next ten minutes the temperature is raised to 85° C. whereby a clear solution is formed. After an additional 15 minutes at 85° C. the clear resin solution is cooled to room temperature. This clear aqueous resin solution has a pH of 10.6 and on a cure-time hot plate has a cure time of 35 to 40 seconds at 150° C. The stability of this solution is somewhat less than three days, and should always be prepared fresh before lamination. Analysis of this resin gives the following results for carbon, nitrogen and hydrogen:

C=33.04
N=42.16
H=5.62

The resin may be used from aqueous solution, or it may be used in the form of a dry molding powder.

The urea-formaldehyde resin may be prepared in the following manner. All parts given are by weight.

60 parts of urea were dissolved in 219 parts of aqueous formaldehyde solution to form a colorless solution having a pH of 4. To the solution was added 1.5 parts of 10% aqueous sodium hydroxide until the pH was changed to 8.7. After three days standing at room temperature, the batch solidifies, and the precipitated dimethylol urea treated by separation.

37.4 parts of the above prepared dimethylol urea are then mixed with 55.5 parts of 37% formalin solution and 7.0 parts paraformaldehyde, and heated gently to about 80° C. A clear solution is formed, and to this was added 28.0 parts crystal urea, which dissolves to give a resin solution containing 73% solids. This solution, which contains 93.5 parts resin non-volatiles, was aged overnight at room temperature.

The following examples will illustrate the various ways in which the modified melamine-formaldehyde and urea-formaldehyde resin compositions of the present invention may be prepared and employed: All parts given are by weight.

EXAMPLE I

A sheet of Fiberglas reinforcing mat (bonded with a thermosetting resin) polyester was cut into three 5" x 5" pieces and the pieces gently fluffed to permit penetration of the molding powder. The glass mat and melamine-formaldehyde resin molding powder were then placed in a closed container in the ratio of 75 parts of molding powder and 25 parts of glass mat. The container was then shaken gently in order to uniformly distribute the powder throughout the glass. The coated glass was then placed in a matched metal die, heated to 250° F. and 50 p. s. i. pressure applied immediately. The mold temperature was raised to 320° F. during 10 minutes and the pressure was kept at 50 p. s. i. for an additional 10 minutes. The mold was then cooled to about 150° F. and the resulting 5" by 5" by ⅛" sheet removed from the mold.

The laminates obtained were very uniform and subjected to physical tests, the results of which are shown in Table 1.

EXAMPLE II

Example I was repeated with the exception that the 75 parts of melamine-formaldehyde molding power was replaced by a mixture consisting of 70 parts by weight of melamine-formaldehyde resin and 5 parts by weight of polyvinylpyrrolidone powder. The laminates obtained were uniform and subjected to physical tests, the results of which we show in Table 1.

EXAMPLE III

Example I was again repeated with the exception that 75 parts by weight of the melamine-formaldehyde resin molding powder were replaced by a mixture consisting of 65 parts by weight of melamine-formaldehyde and 10 parts by weight of polyvinylpyrrolidone. The results of the physical tests are shown in Table 1.

EXAMPLE IV

Example I was again repeated with the exception that 75 parts by weight of melamine-formaldehyde resin molding powder were replaced by a mixture consisting of 60 parts by weight of melamine-formaldehyde resin molding powder and 15 parts by weight of polyvinylpyrrolidone. The results of the physical tests are shown in Table 1.

EXAMPLE V

Example I was again repeated with the exception that 75 parts by weight of the melamine-formaldehyde resin molding powder were replaced by a mixture consisting of 55 parts by weight of melamine-formaldehyde and 20 parts by weight of polyvinylpyrrolidone. The results of the physical tests are shown in Table 1.

EXAMPLE VI

Example I was again repeated with the exception that 75 parts by weight of melamine-formaldehyde resin molding powder were replaced by a mixture of 60 parts of melamine-formaldehyde resin molding powder and 15 parts by weight of a copolymer by vinylpyrrolidone-acrylonitrile in which the vinylpyrrolidone content was 75%. The results of the physical tests are shown in Table 1.

EXAMPLE VII

The aqueous solution of urea-formaldehyde resin as prepared above was compounded with a 30% aqueous polyvinylpyrrolidone solution to give urea-formaldehyde resin to polyvinylpyrrolidone ratios of 93.5–0, 93.5–10 and 93.5–30.

Strips of Volan 181 Fiberglas cloth were impregnated with the straight aqueous urea-formaldehyde resin solution and mixtures of resins in the aforestated ratios and the impregnated strips air dried. The impregnation procedure on each strip was repeated until a glass to resin and resin mixture ratio of 1:1 was obtained after which the impregnated glass cloths were air dried and then laminated between electrically heated flat platens. The results of physical tests are shown in Table 2.

EXAMPLE VIII

Example VII was repeated with the exception that the aqueous solution was replaced by a 30% aqueous polyvinylpyrrolidone-vinyl acetate copolymer in which the vinylpyrrolidone content was 60%. The results of physical tests are shown in Table 2.

It is to be understood that by the term "polymer of N-vinylpyrrolidone" as employed in the appended claims we include not only the polymers but also copolymers of polyvinylpyrrolidone and copolymers of N-vinylpyrrolidone and other polymerizable monomers in which the N-vinylpyrrolidone content ranges from 50 to 95% by weight.

*Table 1*

|  | Percent Polymer or Copolymer of N-vinylpyrrolidone | Flexural Strength, p. s. i., ASTM D-790-49T | | Modulus, ASTM D-790-49T | | Resin/Glass Ratio |
|---|---|---|---|---|---|---|
| Melamine-Formaldehyde Resin of Example I. | 0 | Dry | 20,750 | Dry | 900,000 | 75/25 |
|  |  | Wet | 17,300 | Wet | 875,000 |  |
| Resin Mixture of Example II | 5 polymer | Dry | 26,170 | Dry | 985,000 | 75/25 |
|  |  | Wet | 20,100 | Wet | 1,055,000 |  |
| Resin Mixture of Example III | 10 polymer | Dry | 27,200 | Dry | 1,150,000 | 75/25 |
|  |  | Wet | 20,700 | Wet | 950,000 |  |
| Resin Mixture of Example IV | 15 polymer | Dry | 21,140 | Dry | 825,000 | 75/25 |
|  |  | Wet | 18,500 | Wet | 770,000 |  |
| Resin Mixture of Example V | 20 polymer | Dry | 20,740 | Dry | 828,000 | 75/25 |
|  |  | Wet | 19,500 | Wet | 880,000 |  |
| Resin Mixture of Example VI | 15 copolymer | Dry | 25,500 | Dry | 1,000,000 | 75/25 |
|  |  | Wet | 20,600 | Wet | 965,000 |  |

*Table 2*

|  | 93.5/0 | 93.5/10 | 93.5/30 |
|---|---|---|---|
| Ratio Resin/Polyvinylpyrrolidone: |  |  |  |
| Resin Content Laminate | 50% | 50% | 50%. |
| Cure, pressed | 5 mm./250–300° F./cont. press. 15 mm./330° F./3000 p. s. i. |  |  |
| Flex—Dry | 34,300 | 39,700 | 25,000. |
| Modulus—Dry | 1,935,000 | 1,430,000 | 2,400,000. |
| Appearance | Delaminates very badly—very brittle. | OK | Delaminates badly—very brittle. |
| Ratio Resin/Vinylpyrrolidone-vinyl acetate copolymer: |  |  |  |
| Resin Content Laminate | 50% | 50% | 50%. |
| Cure, pressed | 5 mm./250–300° F./cont. press. 15 mm./330° F./3000 p. s. i. |  |  |
| Flex—Dry | 34,300 | 38,500 | 23,500. |
| Modulus—Dry | 1,935,000 | 1,500,000 | 1,850,000. |
| Appearance | Delaminates very badly—very brittle. | OK | Delaminates badly—very brittle. |

We claim:

1. A composition of matter comprising a mixture of 80 to 97% by weight of an amine-formaldehyde resin selected from the class consisting of melamine-formaldehyde and urea-formaldehyde resins and from 20–3% by weight of a resinous material selected from the class consisting of homopolymers and copolymers of N-vinylpyrrolidone in which the N-vinylpyrrolidone has the following general formula:

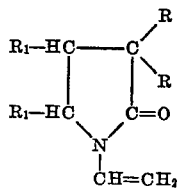

wherein R and R$_1$ represent a member selected from the class consisting of hydrogen, methyl and ethyl groups, the said copolymers containing 40 to 95% by weight of the said N-vinylpyrrolidone and from 60 to 5% by weight of an ethylenically unsaturated polymerizable monomer.

2. A composition of matter according to claim 1 wherein the N-vinyl pyrrolidone of the homopolymer is N-vinyl-2-pyrrolidone.

3. A composition of matter according to claim 1 wherein the N-vinyl pyrrolidone of the homopolymer is 3-methyl-N-vinyl-2-pyrrolidone.

4. A composition of matter according to claim 1 wherein the N-vinyl pyrrolidone of the homopolymer is 3,3-dimethyl-N-vinyl-2-pyrrolidone.

5. A composition of matter according to claim 1 wherein the N-vinyl pyrrolidone of the homopolymer is 4-methyl-N-vinyl-2-pyrrolidone.

6. A composition of matter according to claim 1 wherein the N-vinyl pyrrolidone of the homopolymer is 5-methyl-N-vinyl-2-pyrrolidone.

7. The process of sizing a glass surface which comprises applying thereto a composition comprising a mixture of 80 to 97% by weight of an amine-formaldehyde resin selected from the class consisting of melamine-formaldehyde and urea-formaldehyde resins and from 20–3% by weight of a resinous material selected from the class consisting of homopolymers and copolymers of N-vinylpyrrolidone in which the N-vinylpyrrolidone has the following general formula:

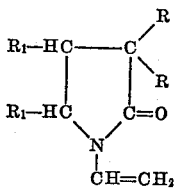

wherein R and R$_1$ represent a member selected from the class consisting of hydrogen, methyl and ethyl groups, the said copolymers containing 40 to 95% by weight of the said N-vinylpyrrolidone and from 60 to 5% by weight of an ethylenically unsaturated polymerizable monomer.

8. The process according to claim 7 wherein the N- vinyl pyrrolidone of the homopolymer is N-vinyl-2-pyrrolidone.

9. The process according to claim 7 wherein the N-vinyl pyrrolidone of the homopolymer is 3-methyl-N-vinyl-2-pyrrolidone.

10. The process according to claim 7 wherein the N-vinyl pyrrolidone of the homopolymer is 3,3-dimethyl-N-vinyl-2-pyrrolidone.

11. The process according to claim 7 wherein the N-vinyl pyrrolidone of the homopolymer is 4-methyl-N-vinyl-2-pyrrolidone.

12. The process according to claim 7 wherein the N-vinyl pyrrolidone of the homopolymer is 5-methyl-N-vinyl-2-pyrrolidone.

References Cited in the file of this patent
UNITED STATES PATENTS

| | | |
|---|---|---|
| 2,244,184 | Austin et al. | June 3, 1941 |
| 2,667,473 | Morner et al. | Jan. 26, 1954 |